(12) United States Patent
Wang

(10) Patent No.: US 9,919,564 B2
(45) Date of Patent: Mar. 20, 2018

(54) PNEUMATIC TIRE

(71) Applicant: The Yokohama Rubber Co., LTD., Minato-ku, Tokyo (JP)

(72) Inventor: Chunyi Wang, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 312 days.

(21) Appl. No.: 14/655,672

(22) PCT Filed: Dec. 28, 2012

(86) PCT No.: PCT/JP2012/084213
§ 371 (c)(1),
(2) Date: Jun. 25, 2015

(87) PCT Pub. No.: WO2014/103064
PCT Pub. Date: Jul. 3, 2014

(65) Prior Publication Data
US 2015/0375568 A1    Dec. 31, 2015

(51) Int. Cl.
*B60C 9/28*    (2006.01)
*B60C 11/00*    (2006.01)
(Continued)

(52) U.S. Cl.
CPC .............. *B60C 9/28* (2013.01); *B60C 9/0007* (2013.01); *B60C 9/185* (2013.01); *B60C 9/1835* (2013.01);
(Continued)

(58) Field of Classification Search
CPC .......... B60C 9/28; B60C 9/22; B60C 11/0083
See application file for complete search history.

(56) References Cited

U.S. PATENT DOCUMENTS 3,939,890 A * 2/1976 Abe ..................... B60C 11/00
152/209.13
5,616,195 A 4/1997 Marquet et al.
(Continued)

FOREIGN PATENT DOCUMENTS

JP    62-152902    *   7/1987
JP    03-099903    *   4/1991
(Continued)

OTHER PUBLICATIONS

English machine translation of JP03-099903, no date.*
(Continued)

*Primary Examiner* — Robert C Dye
(74) *Attorney, Agent, or Firm* — Thorpe North & Western

(57) ABSTRACT

A pneumatic tire includes at least three circumferential main grooves extending in the tire circumferential direction, and a plurality of land portions partitioned by the circumferential main grooves. The belt layer is formed by laminating a pair of cross belts having a belt angle, as an absolute value, of not less than 10° and not more than 45° and mutually opposite signs, and a circumferential reinforcing layer having a belt angle within a range of ±5° with respect to a tire circumferential direction. Also, when viewed as a cross-section from the tire meridian direction, when the wear end surface of the circumferential main grooves is drawn, the distance Dcc on the tire equatorial plane from the circumferential reinforcing layer to the wear end surface and the distance De from the end portion of the circumferential reinforcing layer to the wear end surface have a relationship such that De/Dcc≤0.94.

23 Claims, 13 Drawing Sheets

(51) Int. Cl.
  *B60C 11/01* (2006.01)
  *B60C 9/20* (2006.01)
  *B60C 9/18* (2006.01)
  *B60C 9/00* (2006.01)
  *B60C 11/04* (2006.01)

(52) U.S. Cl.
  CPC ........ *B60C 9/2006* (2013.01); *B60C 11/0083* (2013.01); *B60C 11/01* (2013.01); *B60C 11/04* (2013.01); *B60C 2011/0033* (2013.01); *B60C 2200/06* (2013.01)

(56) References Cited

U.S. PATENT DOCUMENTS

| | | | | |
|---|---|---|---|---|
| 5,779,828 | A * | 7/1998 | Okamoto | B60C 9/18 152/532 |
| 6,401,778 | B1 | 6/2002 | Cluzel | |
| 6,401,780 | B1 * | 6/2002 | Patitsas | B60C 1/00 152/532 |
| 2006/0169380 | A1 | 8/2006 | Radulescu et al. | |
| 2006/0169381 | A1 | 8/2006 | Radulescu et al. | |
| 2006/0169383 | A1 | 8/2006 | Radulescu et al. | |
| 2008/0000566 | A1 * | 1/2008 | Manno | B60C 9/2006 152/527 |
| 2009/0229722 | A1 * | 9/2009 | Isobe | B60C 9/2006 152/209.18 |
| 2009/0277557 | A1 * | 11/2009 | Suzuki | B60C 9/2006 152/532 |
| 2011/0220259 | A1 * | 9/2011 | Suzuki | B60C 11/00 152/209.18 |
| 2012/0097306 | A1 | 4/2012 | Delebecq et al. | |
| 2012/0097307 | A1 | 4/2012 | Delebecq et al. | |
| 2014/0305566 | A1 | 10/2014 | Mashiyama | |
| 2014/0326375 | A1 * | 11/2014 | Okabe | B60C 9/0007 152/154.2 |
| 2014/0326380 | A1 | 11/2014 | Kotoku | |

FOREIGN PATENT DOCUMENTS

| | | | |
|---|---|---|---|
| JP | H03-099903 | | 4/1991 |
| JP | H11-512050 | | 10/1999 |
| JP | 2002-103916 | * | 4/2002 |
| JP | 4008013 | | 9/2007 |
| JP | 2008-001264 | | 1/2008 |
| JP | 4354114 | | 8/2009 |
| JP | 2010-013074 | | 1/2010 |
| JP | 4642760 | | 3/2011 |
| JP | 4663638 | | 4/2011 |
| JP | 4663639 | | 4/2011 |
| JP | 4918948 | | 4/2012 |
| JP | 4984013 | | 7/2012 |
| JP | 2012-522686 | | 9/2012 |
| JP | 2012-522687 | | 9/2012 |
| JP | 5029787 | * | 9/2012 |
| WO | WO 1997/07996 | | 3/1997 |
| WO | WO 2005/016666 | | 2/2005 |
| WO | WO 2005/016667 | | 2/2005 |
| WO | WO 2005/016668 | | 2/2005 |
| WO | WO 2007/148447 | | 12/2007 |
| WO | WO 2010/115891 | | 10/2010 |
| WO | WO 2010/115892 | | 10/2010 |
| WO | WO 2013/042255 | | 3/2013 |
| WO | WO 2013/042256 | | 3/2013 |

OTHER PUBLICATIONS

English machine translation of JP62-152902, no date.*
English machine translation of JP2002-103916, no date.*
International Search Report for International Application No. PCT/JP2012/084213 dated Apr. 9, 2013, 4 pages, Japan.

* cited by examiner

COMPARATIVE EXAMPLE
(De/Dcc=1.00, Gsh/Gcc=1.06)

WORKING EXAMPLES
(De/Dcc=0.92, Gsh/Gcc=1.20)

| | Conventional example | Comparative example 1 | Comparative example 2 | Working example 1 | Working example 2 | Working example 3 |
|---|---|---|---|---|---|---|
| Presence of circumferential reinforcing layer | No | Yes | Yes | Yes | Yes | Yes |
| Gsh/Gcc | 1.06 | 1.06 | 1.24 | 1.06 | 1.10 | 1.20 |
| De/Dcc | - | 1.00 | 1.00 | 0.94 | 0.94 | 0.94 |
| Ws/TW | - | 0.68 | 0.68 | 0.68 | 0.68 | 0.68 |
| TW/SW | 0.92 | 0.92 | 0.92 | 0.92 | 0.92 | 0.92 |
| He/Hcc | - | 1.00 | 1.00 | 1.00 | 1.00 | 1.00 |
| Wb2/Wca | 0.85 | 0.85 | 0.85 | 0.85 | 0.85 | 0.85 |
| TW/Wca | 0.96 | 0.96 | 0.96 | 0.93 | 0.93 | 0.93 |
| No. of ends of the cross belt [ends/50 mm] | 15 | 15 | 15 | 15 | 15 | 15 |
| Es [Mpa] | - | 4.0 | 4.0 | 4.0 | 4.0 | 4.0 |
| Es/E2 | - | 0.80 | 0.80 | 0.80 | 0.80 | 0.80 |
| Es/E3 | - | 0.80 | 0.80 | 0.80 | 0.80 | 0.80 |
| λs [%] | 150 | 150 | 150 | 150 | 150 | 150 |
| λ2 [%] | 150 | 150 | 150 | 150 | 150 | 150 |
| λ2 [%] | 150 | 150 | 150 | 150 | 150 | 150 |
| Ebc [MPa] | 1.2 | 1.2 | 1.2 | 1.2 | 1.2 | 1.2 |
| λbc [%] | 300 | 300 | 300 | 300 | 300 | 300 |
| Belt-edge-separation resistance performance | 100 | 103 | 104 | 104 | 104 | 104 |

FIG. 8A

| | Working example 4 | Working example 5 | Working example 6 | Working example 7 | Working example 8 | Working example 9 | Working example 10 | Working example 11 | Working example 12 |
|---|---|---|---|---|---|---|---|---|---|
| Presence of circumferential reinforcing layer | Yes | Yes | Yes | Yes | Yes | Yes | Yes | Yes | Yes |
| Gsh/Gcc | 1.25 | 1.20 | 1.25 | 1.25 | 1.25 | 1.20 | 1.25 | 1.25 | 1.25 |
| De/Dcc | 0.94 | 0.92 | 0.90 | 0.85 | 0.80 | 0.92 | 0.85 | 0.85 | 0.85 |
| Ws/TW | 0.68 | 0.68 | 0.68 | 0.68 | 0.68 | 0.70 | 0.70 | 0.75 | 0.85 |
| TW/SW | 0.92 | 0.92 | 0.92 | 0.92 | 0.92 | 0.92 | 0.92 | 0.92 | 0.92 |
| He/Hcc | 1.00 | 1.00 | 1.00 | 1.00 | 1.00 | 1.00 | 1.00 | 1.00 | 1.00 |
| Wb2/Wca | 0.85 | 0.85 | 0.85 | 0.85 | 0.85 | 0.85 | 0.85 | 0.85 | 0.85 |
| TW/Wca | 0.93 | 0.93 | 0.93 | 0.93 | 0.93 | 0.93 | 0.93 | 0.93 | 0.93 |
| No. of ends of the cross belt [ends/50 mm] | 15 | 15 | 15 | 15 | 15 | 15 | 15 | 15 | 15 |
| Es [Mpa] | 4.0 | 4.0 | 4.0 | 4.0 | 4.0 | 4.0 | 4.0 | 4.0 | 4.0 |
| Es/E2 | 0.80 | 0.80 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 | 0.80 | 0.80 |
| λs[%] | 150 | 150 | 150 | 150 | 150 | 150 | 150 | 150 | 150 |
| λ2[%] | 150 | 150 | 150 | 150 | 150 | 150 | 150 | 150 | 150 |
| λ2[%] | 150 | 150 | 150 | 150 | 150 | 150 | 150 | 150 | 150 |
| Ebc [MPa] | 1.2 | 1.2 | 1.2 | 1.2 | 1.2 | 1.2 | 1.2 | 1.2 | 1.2 |
| λbc [%] | 300 | 300 | 300 | 300 | 300 | 300 | 300 | 300 | 300 |
| Belt-edge-separation resistance performance | 104 | 105 | 105 | 108 | 106 | 110 | 110 | 112 | 113 |

FIG. 8B

| | Working example 13 | Working example 14 | Working example 15 | Working example 16 | Working example 17 | Working example 18 | Working example 19 |
|---|---|---|---|---|---|---|---|
| Presence of circumferential reinforcing layer | Yes | Yes | Yes | Yes | Yes | Yes | Yes |
| Gsh/Gcc | 1.25 | 1.25 | 1.25 | 1.25 | 1.25 | 1.25 | 1.25 |
| De/Dcc | 0.85 | 0.85 | 0.85 | 0.85 | 0.85 | 0.85 | 0.85 |
| Ws/TW | 0.85 | 0.85 | 0.85 | 0.85 | 0.85 | 0.85 | 0.85 |
| TW/SW | 0.80 | 0.87 | 0.89 | 0.87 | 0.87 | 0.87 | 0.87 |
| He/Hcc | 1.00 | 1.00 | 1.00 | 0.97 | 0.92 | 0.87 | 0.92 |
| Wb2/Wca | 0.85 | 0.85 | 0.85 | 0.85 | 0.85 | 0.85 | 0.70 |
| TW/Wca | 0.93 | 0.93 | 0.93 | 0.93 | 0.93 | 0.93 | 0.93 |
| No. of ends of the cross belt [ends/50 mm] | 15 | 15 | 15 | 15 | 15 | 15 | 15 |
| Es [Mpa] | 4.0 | 4.0 | 4.0 | 4.0 | 4.0 | 4.0 | 4.0 |
| Es/E2 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 |
| λs [%] | 150 | 150 | 150 | 150 | 150 | 150 | 150 |
| λ2 [%] | 150 | 150 | 150 | 150 | 150 | 150 | 150 |
| λ2 [%] | 150 | 150 | 150 | 150 | 150 | 150 | 150 |
| Ebc [MPa] | 1.2 | 1.2 | 1.2 | 1.2 | 1.2 | 1.2 | 1.2 |
| λbc [%] | 300 | 300 | 300 | 300 | 300 | 300 | 300 |
| Belt-edge-separation resistance performance | 114 | 117 | 116 | 118 | 120 | 117 | 121 |

FIG. 9A

|  | Working example 20 | Working example 21 | Working example 22 | Working example 23 | Working example 24 | Working example 25 | Working example 26 |
|---|---|---|---|---|---|---|---|
| Presence of circumferential reinforcing layer | Yes | Yes | Yes | Yes | Yes | Yes | Yes |
| Gsh/Gcc | 1.25 | 1.25 | 1.25 | 1.25 | 1.25 | 1.25 | 1.25 |
| De/Dcc | 0.85 | 0.85 | 0.85 | 0.85 | 0.85 | 0.85 | 0.85 |
| Ws/TW | 0.85 | 0.85 | 0.85 | 0.85 | 0.85 | 0.85 | 0.85 |
| TW/SW | 0.87 | 0.87 | 0.87 | 0.87 | 0.87 | 0.87 | 0.87 |
| He/Hcc | 0.92 | 0.92 | 0.92 | 0.92 | 0.92 | 0.92 | 0.92 |
| Wb2/Wca | 0.85 | 0.87 | 0.85 | 0.85 | 0.85 | 0.85 | 0.85 |
| TW/Wca | 0.93 | 0.93 | 0.91 | 0.82 | 0.93 | 0.93 | 0.93 |
| No. of ends of the cross belt [ends/50 mm] | 15 | 15 | 15 | 15 | 18 | 23 | 28 |
| Es [MPa] | 4.0 | 4.0 | 4.0 | 4.0 | 4.0 | 4.0 | 4.0 |
| Es/E2 | 0.80 | 0.80 | 0.80 | 0.80 | 0.80 | 0.80 | 0.80 |
| Es/E3 | 0.80 | 0.80 | 0.80 | 0.80 | 0.80 | 0.80 | 0.80 |
| As [%] | 150 | 150 | 150 | 150 | 150 | 150 | 150 |
| λ2 [%] | 150 | 150 | 150 | 150 | 150 | 150 | 150 |
| λ2 [%] | 150 | 150 | 150 | 150 | 150 | 150 | 150 |
| Ebc [MPa] | 1.2 | 1.2 | 1.2 | 1.2 | 1.2 | 1.2 | 1.2 |
| λbc [%] | 300 | 300 | 300 | 300 | 300 | 300 | 300 |
| Belt-edge-separation resistance performance | 122 | 121 | 123 | 124 | 123 | 125 | 123 |

FIG. 9B

| | Working example 27 | Working example 28 | Working example 29 | Working example 30 | Working example 31 | Working example 32 | Working example 33 |
|---|---|---|---|---|---|---|---|
| Presence of circumferential reinforcing layer | Yes | Yes | Yes | Yes | Yes | Yes | Yes |
| Gsh/Gcc | 1.25 | 1.25 | 1.25 | 1.25 | 1.25 | 1.25 | 1.25 |
| De/Dcc | 0.85 | 0.85 | 0.85 | 0.85 | 0.85 | 0.85 | 0.85 |
| Ws/TW | 0.85 | 0.85 | 0.85 | 0.85 | 0.85 | 0.85 | 0.85 |
| TW/SW | 0.87 | 0.87 | 0.87 | 0.87 | 0.87 | 0.87 | 0.87 |
| He/Hcc | 0.92 | 0.92 | 0.92 | 0.92 | 0.92 | 0.92 | 0.92 |
| Wb2/Wca | 0.85 | 0.85 | 0.85 | 0.85 | 0.85 | 0.85 | 0.85 |
| TW/Wca | 0.93 | 0.93 | 0.93 | 0.93 | 0.93 | 0.93 | 0.93 |
| No. of ends of the cross belt [ends/50 mm] | 23 | 23 | 23 | 23 | 23 | 23 | 23 |
| Es [Mpa] | 4.5 | 6.0 | 7.5 | 6.0 | 6.0 | 6.0 | 6.0 |
| Es/E2 | 0.80 | 0.80 | 0.80 | 0.90 | 1.00 | 1.10 | 1.00 |
| Es/E3 | 0.80 | 0.80 | 0.80 | 0.90 | 1.00 | 1.10 | 1.00 |
| As [%] | 150 | 150 | 150 | 150 | 150 | 150 | 200 |
| A2 [%] | 150 | 150 | 150 | 150 | 150 | 150 | 200 |
| A2 [%] | 150 | 150 | 150 | 150 | 150 | 150 | 200 |
| Ebc [MPa] | 1.2 | 1.2 | 1.2 | 1.2 | 1.2 | 1.2 | 1.2 |
| Abc [%] | 300 | 300 | 300 | 300 | 300 | 300 | 300 |
| Belt-edge-separation resistance performance | 124 | 125 | 124 | 126 | 130 | 127 | 135 |

FIG. 10A

| | Working example 34 | Working example 35 | Working example 36 | Working example 37 | Working example 38 | Working example 39 |
|---|---|---|---|---|---|---|
| Presence of circumferential reinforcing layer | Yes | Yes | Yes | Yes | Yes | Yes |
| Gsh/Gcc | 1.25 | 1.25 | 1.25 | 1.25 | 1.25 | 1.25 |
| De/Dcc | 0.85 | 0.85 | 0.85 | 0.85 | 0.85 | 0.85 |
| Ws/TW | 0.85 | 0.85 | 0.85 | 0.85 | 0.85 | 0.85 |
| TW/SW | 0.87 | 0.87 | 0.87 | 0.87 | 0.87 | 0.87 |
| He/Hcc | 0.92 | 0.92 | 0.92 | 0.92 | 0.92 | 0.92 |
| Wb2/Wca | 0.85 | 0.85 | 0.85 | 0.85 | 0.85 | 0.85 |
| TW/Wca | 0.93 | 0.93 | 0.93 | 0.93 | 0.93 | 0.93 |
| No. of ends of the cross belt [ends/50 mm] | 23 | 23 | 23 | 23 | 23 | 23 |
| Es [Mpa] | 6.0 | 6.0 | 6.0 | 6.0 | 6.0 | 6.0 |
| Es/E2 | 1.00 | 1.00 | 1.00 | 1.00 | 1.00 | 1.00 |
| Es/E3 | 1.00 | 1.00 | 1.00 | 1.00 | 1.00 | 1.00 |
| λs[%] | 250 | 250 | 250 | 250 | 250 | 250 |
| λ2[%] | 250 | 250 | 250 | 250 | 250 | 250 |
| λ2[%] | 250 | 250 | 250 | 250 | 250 | 250 |
| Ebc [MPa] | 1.2 | 1.5 | 2.3 | 3.0 | 2.3 | 2.3 |
| Abc [%] | 300 | 300 | 300 | 300 | 400 | 470 |
| Belt-edge-separation resistance performance | 137 | 138 | 140 | 139 | 141 | 145 |

FIG. 10B

PNEUMATIC TIRE

TECHNICAL FIELD

The present technology relates to a pneumatic tire, and more particularly relates to a pneumatic tire with improved belt-edge-separation resistance performance.

BACKGROUND

Recent heavy duty tires mounted on trucks, buses, and the like maintain the shape of the tread portion due to the tires having a low aspect ratio while having a circumferential reinforcing layer disposed in the belt layer. The circumferential reinforcing layer is a belt ply having a belt angle that is substantially 0° with respect to the tire circumferential direction, and is disposed so as to be stacked upon a pair of cross belts. The technologies disclosed in Japanese Patent Nos. 4642760, 4663638 and 4663639, as well as in Japanese Unexamined Patent Application Publication (translation of PCT application) No. 2012-522686 are conventional pneumatic tires that are configured in this manner.

Here, in the pneumatic tire, there is a problem that it is necessary to suppress separation of peripheral rubber at an end portion of a belt ply.

SUMMARY

The present technology provides a pneumatic tire with improved belt-edge-separation resistance performance in consideration of the above problem.

A pneumatic tire according to the present technology has a carcass layer, a belt layer disposed on an outer side in a tire radial direction of the carcass layer, a tread rubber disposed on the outer side in the tire radial direction of the belt layer, at least three circumferential main grooves extending in a tire circumferential direction, and a plurality of land portions partitioned and formed by the circumferential main grooves, wherein the belt layer is formed by laminating a pair of cross belts having a belt angle, as an absolute value, of not less than 10° and not more than 45° and mutually opposite signs, and a circumferential reinforcing layer having a belt angle within a range of ±5° with respect to the tire circumferential direction, and when a wear end surface WE of the circumferential main groove is drawn when viewed as a cross-section from a tire meridian direction, a distance Dcc on the tire equatorial plane from the circumferential reinforcing layer to the wear end surface WE and a distance De from an end portion of the circumferential reinforcing layer to the wear end surface WE have a relationship such that De/Dcc≤0.94.

In the pneumatic tire according to the present technology, the distances Dcc, De of the circumferential reinforcing layer with respect to the wear end surface WE are made appropriate, so the strain of the circumferential reinforcing layer when the tire makes ground contact is reduced. Accordingly, there is an advantage that separation of the peripheral rubber of the circumferential reinforcing layer is reduced.

BRIEF DESCRIPTION OF THE DRAWINGS

FIGS. 8A-8B include a table showing results of performance testing of pneumatic tires according to embodiments of the present technology.

FIGS. 9A-9B include a table showing results of performance testing of pneumatic tires according to embodiments of the present technology.

FIGS. 10A-10B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

Pneumatic Tire

Figure 1:
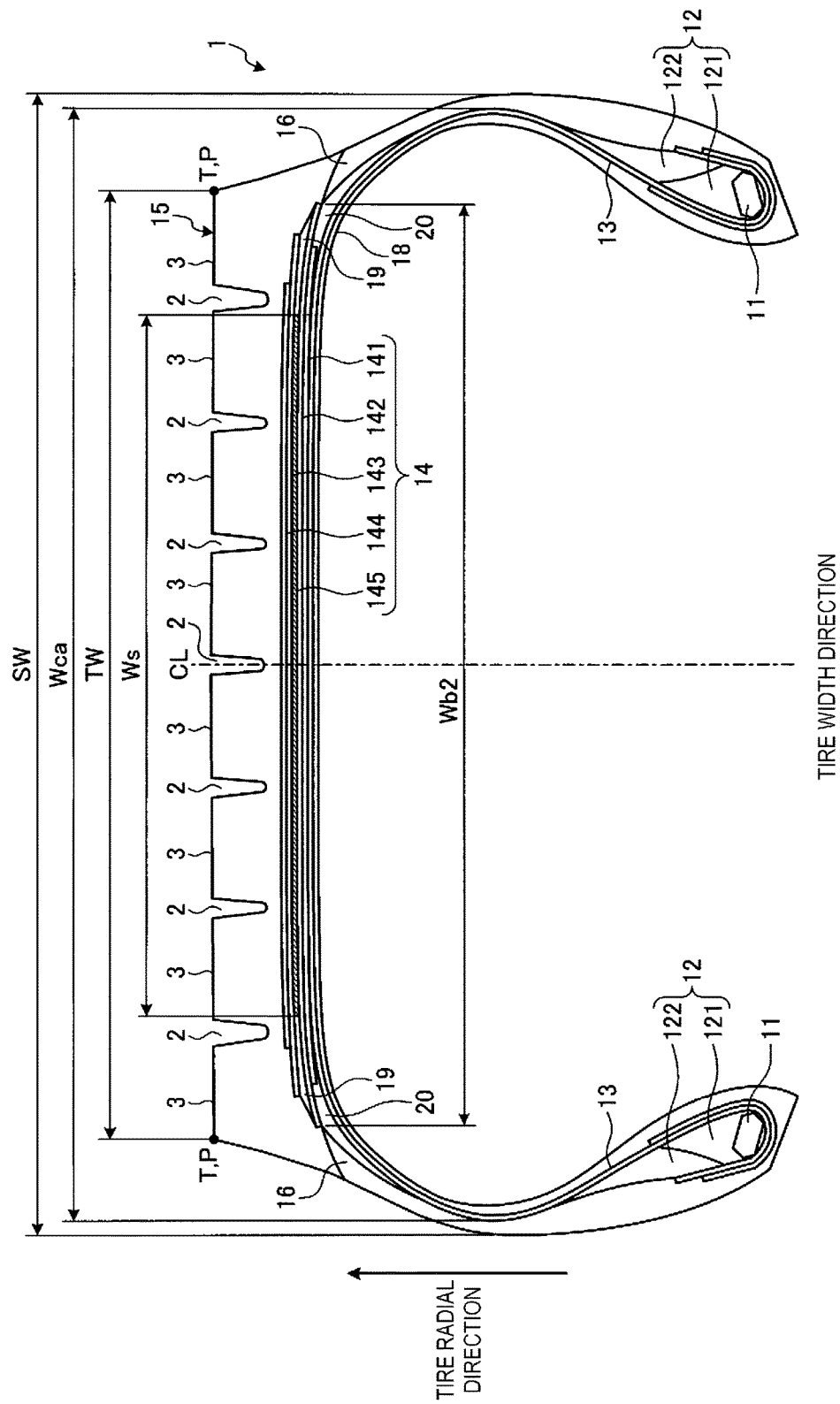
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In this drawing, a radial tire for heavy loads that is mounted on trucks, buses, and the like for long-distance transport is illustrated as an example of the pneumatic tire 1. Note that the symbol CL refers to a tire equator plane. Moreover, a tread edge P and a tire ground contact edge T are in accord with each other in FIG. 1. The circumferential reinforcing layer 145 in FIG. 1 is indicated by hatching.

A pneumatic tire 1 includes a pair of bead cores 11,11, a pair of bead fillers 12,12, a carcass layer 13, a belt layer 14, tread rubber 15, and a pair of side wall rubbers 16,16 (see FIG. 1).

The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in the tire radial direction so as to reinforce the bead portions.

The carcass layer 13 stretches between the left and right side bead cores 11 and 11 in toroidal form, forming a framework for the tire. Additionally, both ends of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fiber materials (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a plurality of belt plies 141 to 145, and disposed to extend over a periphery of the carcass layer 13. A detailed configuration of the belt layer 14 is described below.

The tread rubber 15 is disposed on an outer circumference in the tire radial direction of the carcass layer 13 and the belt layer 14, and forms a tread portion of the tire. The pair of side wall rubbers 16,16 is disposed on each outer side of the carcass layer 13 in the tire width direction, so as to form left and right side wall portions of the tire.

In the configuration illustrated in FIG. 1, the pneumatic tire 1 includes seven circumferential main grooves 2 that extend in a tire circumferential direction, and eight land portions 3 partitioned and formed by the circumferential main grooves 2. The land portions 3 are formed of ribs that continue in the tire circumferential direction or blocks that are segmented in the circumferential direction by lug grooves (not illustrated).

Here, "circumferential main grooves" refers to circumferential grooves having a groove width of 5.0 mm or greater. The groove width of the circumferential main grooves is measured excluding the notched portions and/or the chamfered portions formed at the groove opening portion.

Additionally, in the pneumatic tire 1, the left and right outermost circumferential main grooves 2, 2 in the tire width direction are referred to as outermost circumferential main grooves. Moreover, the left and right land portions 3, 3 on the outer side in the tire width direction that are defined by the left and right outermost circumferential main grooves 2, 2 are referred to as shoulder land portions.

[Belt Layer]

Figure 2:
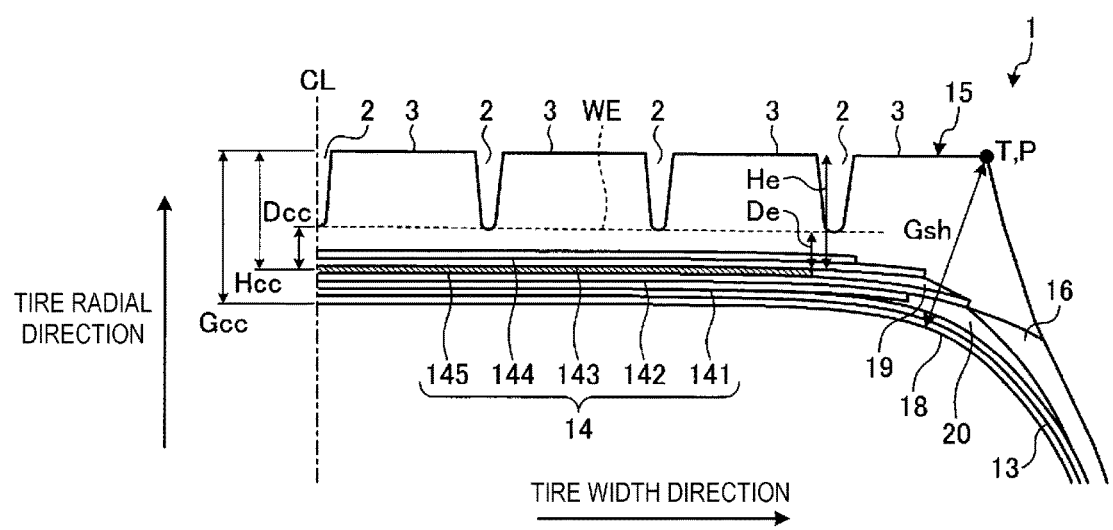
FIG. 2 is an explanatory view illustrating a belt layer of the pneumatic tire depicted in FIG. 1.
Figure 3:
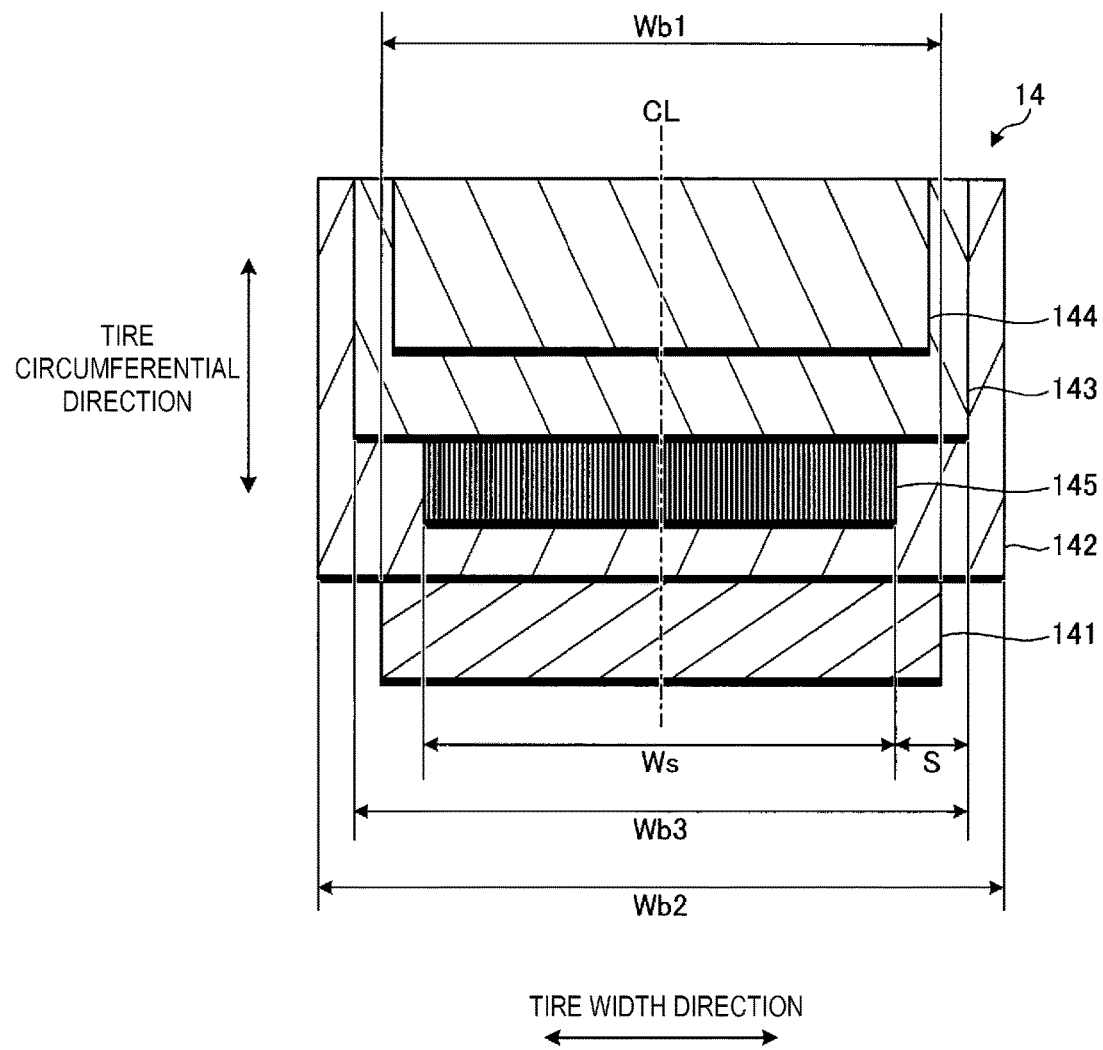
FIG. 3 is an explanatory view illustrating the belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a laminated structure of the belt layer 14. Furthermore, the thin lines in the belt plies 141 to 145 in FIG. 3 schematically represent the respective belt cords of the belt plies 141 to 145.

The belt layer 14 is formed by laminating a large angle belt 141, a pair of cross belts 142, 143, a belt cover 144, and a circumferential reinforcing layer 145, and is disposed by being wound and mounted onto the periphery of the carcass layer 13 (see FIG. 2).

The large angle belt 141 is configured by a plurality of belt cords formed from steel or organic fiber materials, covered by coating rubber, and subjected to a rolling process, having a belt angle (angle of inclination of the fiber direction of the belt cords with respect to the tire circumferential direction), as an absolute value, of not less than 45° and not more than 70°. Moreover, the large angle belt 141 is disposed so as to be laminated outward in the tire radial direction of the carcass layer 13.

The pair of cross belts 142, 143 are configured by a plurality of belt cords formed from steel or organic fiber materials, covered by coating rubber, and subjected to a rolling process, having a belt angle, as an absolute value, of not less than 10° and not more than 45°. Additionally, the pair of cross belts 142, 143 have belt angles that are of mutually opposite sign to each other, and are laminated so that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not illustrated). Also, in the present embodiment, the pair of cross belts 142, 143 are disposed laminated on the outer side of the large angle belt 141 in the tire radial direction.

Also, the belt cover 144 is configured by a plurality of belt cords formed from steel or organic fiber materials, covered by coating rubber, and subjected to a rolling process, having a belt angle, as an absolute value, of not less than 10° and not more than 45°. Also, the belt cover 144 is disposed laminated on the outer side in the tire radial direction of the pair of cross belts 142, 143. In this embodiment, the belt cover 144 has the same belt angle as the outer-side cross belt 143, and is disposed in the outermost layer of the belt layer 14.

The circumferential reinforcing layer 145 is configured by belt cords formed from steel, and covered by coating rubber that are wound in a spiral manner with an inclination within a range of ±5° with respect to the tire circumferential direction. Additionally, the circumferential reinforcing layer 145 is disposed interposed between the pair of cross belts 142, 143 in the present embodiment. Additionally, the circumferential reinforcing layer 145 is disposed inward in the tire width direction of left and right edges of the pair of cross belts 142, 143. Specifically, the circumferential reinforcing layer 145 is formed by winding one or a plurality of wires in a spiral manner around the periphery of the inner-side cross belt 142. This circumferential reinforcing layer 145 reinforces the stiffness in the tire circumferential direction. As a result, the tire durability is improved.

In the pneumatic tire 1, the belt layer 14 may have an edge cover (not illustrated). Generally, the edge cover is configured by a plurality of belt cords formed from steel or organic fiber materials covered by coating rubber and subjected to a rolling process, having a belt angle, as an absolute value, of not less than 0° and not more than 5°. Additionally, edge covers are disposed outward in the tire radial direction of the left and right edges of the outer-side cross belt 143 (or the inner-side cross belt 142). The difference in radial growth between the center region and the shoulder region of the tread portion is reduced and uneven wear resistance of the tire is improved due to a hoop effect demonstrated by the edge covers.

Additionally, in the configuration in FIG. 2, the circumferential reinforcing layer 145 is disposed so as to be interposed between the pair of cross belts 142, 143 (see FIG. 2). However, the circumferential reinforcing layer 145 is not limited as such, and may also disposed on the outer side in the tire radial direction of the pair of cross belts 142, 143 (not illustrated). Additionally, the circumferential reinforcing layer 145 may also be disposed on the inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated).

[Improvement in Belt-Edge-Separation Resistance Performance]

Recent heavy duty tires mounted on trucks, buses, and the like maintain the shape of the tread portion due to the tires having a low aspect ratio while having a circumferential reinforcing layer disposed in the belt layer. Specifically, by disposing the circumferential reinforcing layer at the tread center region, and exploiting the hoop effect thereof, radial growth of the tread is suppressed and the tread shape is maintained.

In such a configuration, as the stiffness of the belt layer in the tire circumferential direction is increased due to the circumferential reinforcing layer, there is a problem that separation of the peripheral rubber at the edge portion of the belt ply occurs easily. Such a problem clearly appears, in particular, under high internal pressure and heavy load long-term service conditions.

Here, in the pneumatic tire 1, the configuration described below is adopted in order to improve tire durability performance by suppressing the occurrence of the above-described separation (see FIG. 1 to FIG. 3).

First, a wear end surface WE of the circumferential main groove 2 is drawn as illustrated in FIG. 2 when viewed as a cross-section from the tire meridian direction. The wear end surface WE refers to the surface estimated from a wear indicator present in the tire. Additionally, the wear end surface WE is measured under the condition of a single tire with the tire in a non-inflated state. In a typical pneumatic tire, the wear end surface WE is on a curve that is roughly parallel with the tread profile.

At this time, a distance Dcc on the tire equatorial plane CL from the circumferential reinforcing layer 145 to the wear end surface WE and a distance De from an end portion of the circumferential reinforcing layer 145 to the wear end surface WE preferably have a relationship such that De/Dcc≤0.94, and more preferably have a relationship such that De/Dcc≤0.92. There is no particular limitation on the lower limit of the ratio De/Dcc, but it is restricted by the relationship of the distance between the outermost belt layer and the wear end surface WE. For example, preferably, the lower limit of the ratio De/Dcc is in the range of 0.65≤De/Dcc.

The distance Dcc and distance De are measured under the condition of a single tire with the tire in a non-inflated state. Additionally, the measurement point on the circumferential reinforcing layer 145 side is defined by a curve connecting the center points of the belt cords that constitute the circumferential reinforcing layer 145, when viewed as a cross-section from the tire meridian direction. Moreover, the end portion of the circumferential reinforcing layer 145 is defined using the belt cord on the outermost side in the tire width direction among the belt cords that constitute the circumferential reinforcing layer 145.

Herein, "specified rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Specified internal pressure" refers to "maximum air pressure" stipulated by JATMA, a maximum value in "tire load limits at various cold inflation pressures" defined by TRA, and "inflation pressures" stipulated by ETRTO. Note that "specified load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the specified internal pressure is an air pressure of 180 kPa, and the specified load is 88% of the maximum load capacity.

Also, a distance Gcc from the tread profile to the tire inner circumferential surface at the tire equatorial plane CL and a distance Gsh from the tread edge P to the tire inner circumferential surface preferably have a relationship such that 1.10≤Gsh/Gcc, and more preferably a relationship such that 1.20≤Gsh/Gcc.

There is no particular limitation on the upper limit of the ratio Gsh/Gcc. However, when the tire is mounted on a specified rim, inflated to the specified internal pressure, and is in an unloaded state, preferably the upper limit of the ratio Gsh/Gcc is prescribed so that the radius at the tread edge P of the tread profile is less than or equal to the radius at the tire equatorial plane CL. In other words, preferably, the upper limit of the ratio Gsh/Gcc is prescribed so that the tread profile has an arc shape having a center on the inner side in the tire radial direction or a linear shape, and does not have an inverse-R shape (an arc shape having a center on the outer side in the tire radial direction). For example, in a configuration having a square shaped shoulder portion as in FIG. 2, the upper limit of the ratio Gsh/Gcc is approximately from 1.4 to 1.5. On the other hand, in the configuration having a round shaped shoulder portion as in FIG. 5 described below, the upper limit of the ratio Gsh/Gcc is approximately from 1.3 to 1.4.

The distance Gcc is measured as the distance from the intersection between the tire equatorial plane CL and the tread profile to the intersection between the tire equatorial plane CL and the tire inner circumferential surface when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured omitting the circumferential main groove 2. The distance Gsh is measured as the length of a perpendicular line from the tread edge P to the tire inner circumferential surface when viewed as a cross-section from the tire meridian direction.

In the configuration illustrated in FIG. 2, the pneumatic tire 1 includes an inner liner 18 on the inner circumferential surface of the carcass layer 13, and the inner liner 18 is disposed across the entire region of the tire inner circumferential surface. In such a configuration, the distance Gcc and the distance Gsh are measured on the basis of the outer surface of the innerliner 18 (tire inner circumferential surface).

The tread edge P refers to a point of the tread edge portion in a configuration having a (1) square shaped shoulder portion. For example, in the configuration illustrated in FIG. 2, the tread edge P and a tire ground contact edge T are in accord with each other due to the shoulder portion having a square shape. Conversely, (2) in a configuration having the round shaped shoulder portion, as illustrated in the modified example of FIG. 5 described below, taking an intersection P' between the tread portion profile and the side wall portion profile when viewed as a cross-section from the tire meridian direction, the tread edge P is taken as the bottom of a perpendicular line drawn from the intersection P' to the shoulder portion.

Additionally, the "tire ground contact edge T" refers to the maximum width position in a tire axial direction of a contact surface between the tire and a flat plate in a configuration in which the tire is mounted on a specified rim, inflated to the specified internal pressure, placed perpendicularly to the flat plate in a static state, and loaded with a load corresponding to the specified load.

Figure 4A:
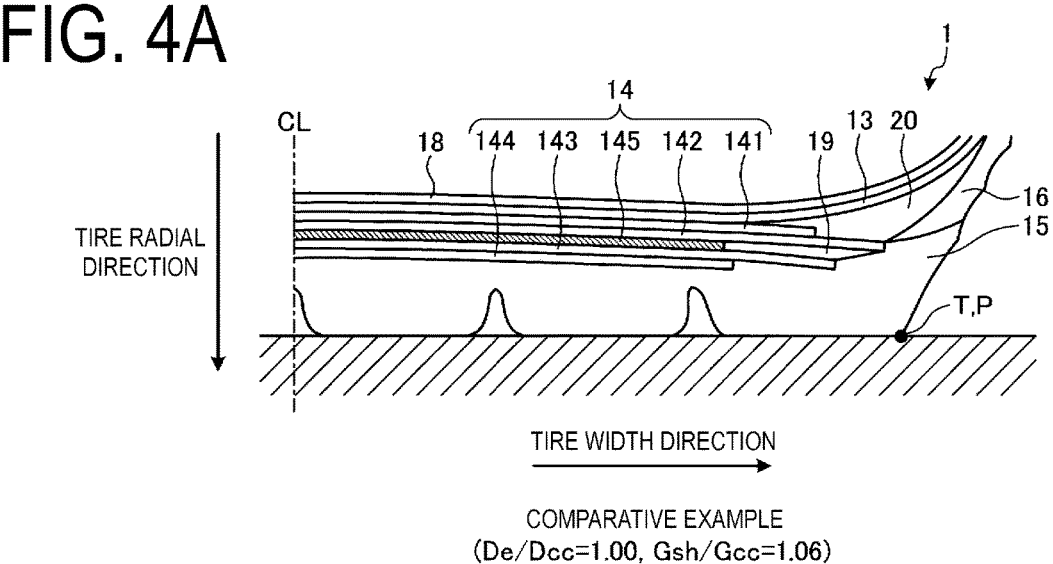
FIGS. 4A and 4B are an explanatory views illustrating effects of the pneumatic tire depicted in FIG. 1.
Figure 4B:
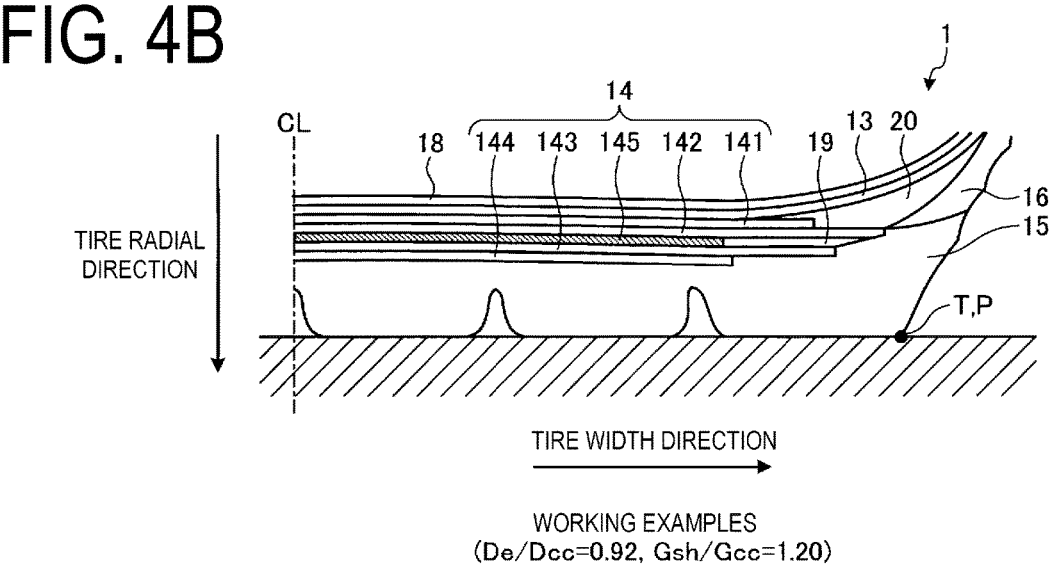

FIGS. 4A and 4B are explanatory views illustrating effects of the pneumatic tire depicted in FIG. 1. FIGS. 4A and 4B illustrates the ground contact conditions of tires having different ratios De/Dcc and Gsh/Gcc.

In the tire of the Comparative Example of FIG. 4A, the ratio De/Dcc is set equal to that of the configurations in FIGS. 1 to 3 (De/Dcc=1.00), and, the ratio Gsh/Gcc is set smaller (Gsh/Gcc=1.06). In this configuration, when the tire does not contact the ground, the tread profile has a shoulder drop shape in which the outer diameter reduces from the tire equatorial plane CL toward the tread edge P (not illustrated). Therefore, when the tire makes ground contact as illustrated in FIG. 4A, the tread portion shoulder region deforms greatly toward the road surface (the outer side in the tire radial direction). At this time, the distances Dcc and De from the circumferential reinforcing layer 145 to the wear end surface WE are the same (De/Dcc=1.00), so the end portion of the circumferential reinforcing layer 145 bends greatly toward the road surface side (the outer side in the tire radial direction) following the deformation of the tread portion shoulder region. Therefore, the strain of the circumferential reinforcing layer 145 is large when the tire makes ground contact.

In contrast, in the tire according to the Working Example of FIG. 4B, the ratio De/Dcc is set smaller than the configurations of FIGS. 1 to 3 (De/Dcc=0.92), and, the ratio Gsh/Gcc is set larger (Gsh/Gcc=1.20). In this configuration, when the tire does not contact the ground, the difference in diameter between the outer diameter at the tire equatorial plane CL and the outer diameter at the tread edge P of the tread profile is small, and the tread profile overall has a flat shape (approximately parallel to the tire rotational axis) (see FIGS. 1 and 2). Therefore, as illustrated in FIG. 4B, the amount of deformation of the tread portion shoulder region when the tire makes ground contact is small. In addition, the distances Dcc and De from the circumferential reinforcing layer 145 to the wear end surface WE have the relationship De<Dcc, so when the tire makes ground contact, the circumferential reinforcing layer 145 has an overall flat shape when the end portion of the circumferential reinforcing layer 145 bends following the deformation of the tread portion shoulder region. In this way, the strain of the circumferential reinforcing layer 145 is reduced when the tire contacts the ground.

As described above, in the configuration of FIG. 4B, the amount of deformation of the tread portion shoulder region when the tire makes ground contact is small compared with the configuration of FIG. 4A, and, the strain of the circumferential reinforcing layer 145 is small. In this way, the stiffness of the tread portion shoulder region is maintained, and, separation of the peripheral rubber of the circumferential reinforcing layer 145 is reduced.

[Round Shaped Shoulder Portion]

Figure 5:
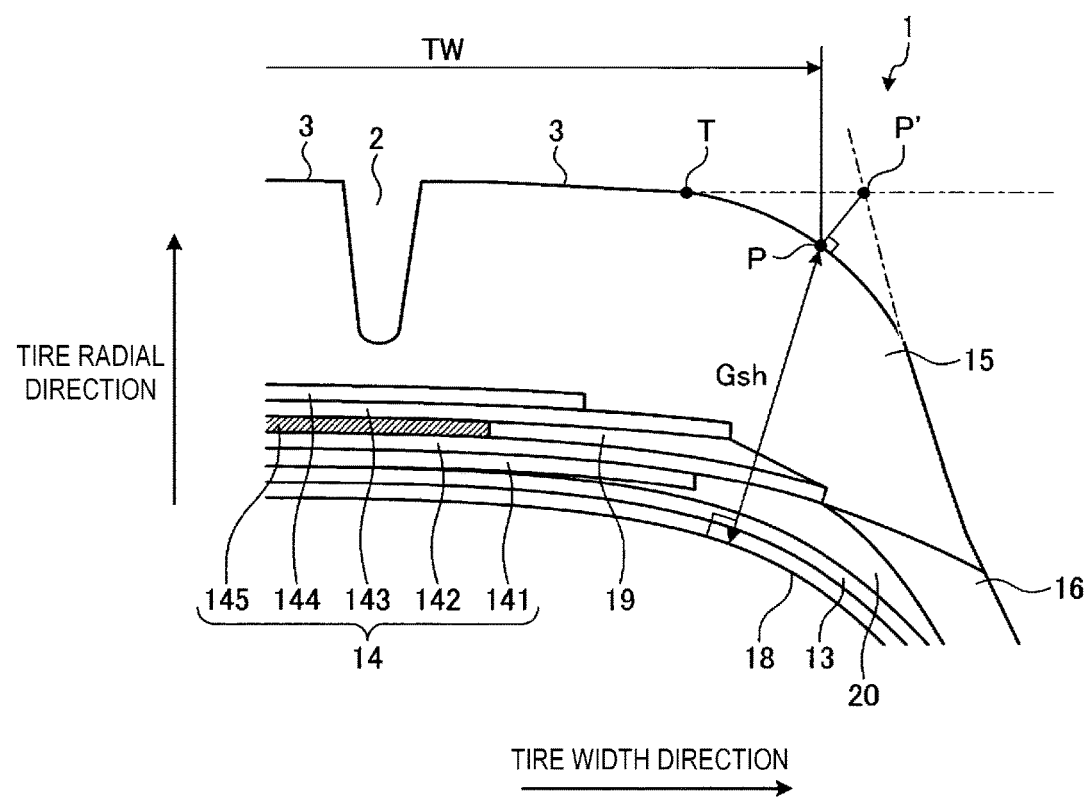
FIG. 5 is an explanatory view illustrating a modified example of the pneumatic tire depicted in FIG. 1.

FIG. 5 is an explanatory view of a modified example of the pneumatic tire depicted in FIG. 1. FIG. 5 illustrates a configuration having a shoulder portion with a round shape.

In the configuration in FIG. 1, the shoulder portion has a square shape, in which the tire ground contact edge T and tread edge P are in accord, as illustrated in FIG. 2.

However, the shoulder portion is not limited as such, and may also have a round shape, as illustrated in FIG. 5. In such a case, an intersection P' is taken from the tread portion profile and the side wall portion profile when viewed as a cross-section from the tire meridian direction, and the tread edge P is taken as the bottom of a perpendicular line drawn from the intersection P' to the shoulder portion. Therefore, the tire ground contact edge T and the tread edge P normally are in mutually different locations.

[Shoulder Land Portion Inverse-R Shape]

Figure 6:
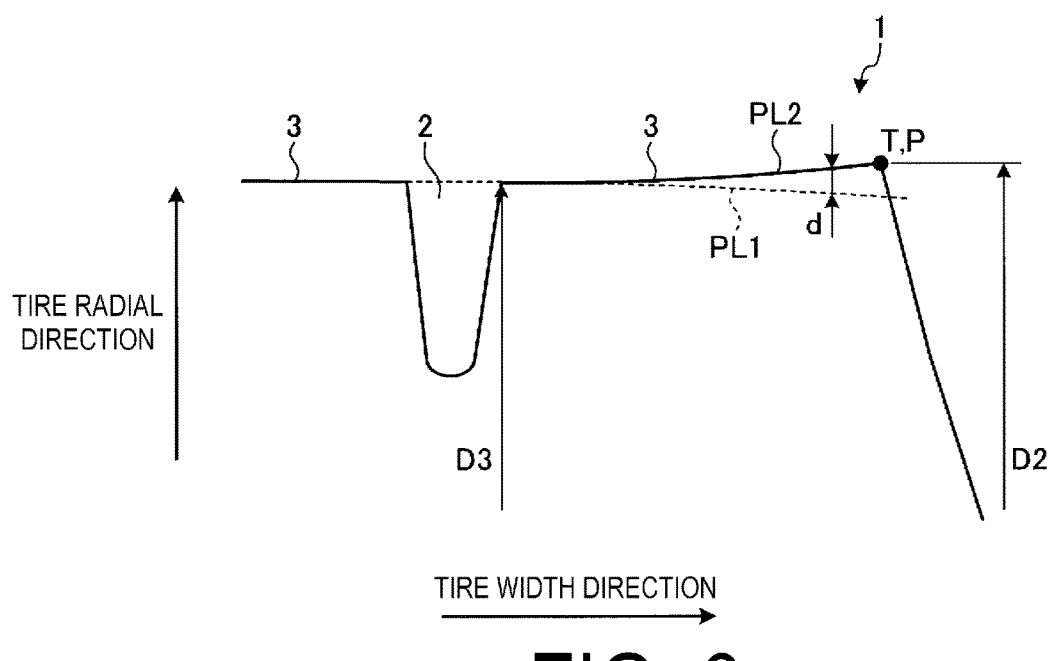
FIG. 6 is an explanatory view illustrating a modified example of the pneumatic tire depicted in FIG. 1.

FIG. 6 is an explanatory view of a modified example of the pneumatic tire depicted in FIG. 1. FIG. 6 illustrates the relationship between a first profile PL1 of the land portion 3 in the center region and a second profile PL2 of the shoulder land portion 3.

In the configuration of FIG. 1, when viewed as a cross-section from the tire meridian direction in the inflated state, the tread profile from the tire equatorial plane CL to the tire ground contact edge T is substantially a straight line, and has a flat ground contact patch form.

In contrast, in the configuration of FIG. 6, when viewed as a cross-section from the tire meridian direction in the inflated state, the center land portions 3 and the second land portions 3 on the inner side in the tire width direction from the left and right outermost circumferential main grooves 2, 2 have a first profile PL1 that is convex to the outer side in the tire radial direction. Also, the shoulder land portions 3 on the outer side in the tire width direction of the left and right outermost circumferential main grooves 2 have a second profile PL2 that is convex to the inner side in the tire radial direction within the ground contact patch. Also, a distance d in the tire radial direction between the extended line of the first profile PL1 and the second profile PL2 within the ground contact patch of the shoulder land portion 3 increases toward the outer side in the tire width direction.

Also, in the configuration as described above, preferably, the first profile PL1 and the second profile PL2 are smooth curves formed from a single arc or a combination of a plurality of arcs. However, this is not a limitation, and the first profile PL1 and the second profile PL2 may be configured to include a straight line in a portion thereof.

Also, preferably, a diameter D2 of the second profile PL2 at the tire ground contact edge T and a diameter D3 of the second profile PL2 at the edge portions on the inner side in the tire width direction of the shoulder land portions 3 have a relationship such that D3<D2. Therefore, as illustrated in FIG. 6, preferably, the shoulder land portion 3 has a ground contact patch form that rises up to the outer side in the tire radial direction toward the outer side in the tire width direction.

However, this is not a limitation, and the diameter D2 of the second profile PL2 at the tire ground contact edge T and the diameter D3 of the second profile PL2 at the end portion on the inner side in the tire width direction of the shoulder land portion 3 may have the relationship D2≤D3. Therefore, the shoulder land portion 3 may have a flat ground contact patch form or it may have a ground contact patch form with the shoulder dropping toward the outer side in the tire width direction.

Note that the profile shape and the profile diameter are measured when the tire is mounted on a specified rim, inflated to the specified internal pressure, and is in an unloaded state. Also, the diameter of the profile is measured as the diameter of the profile with the tire rotational axis as center.

Additional Data

Additionally in the pneumatic tire 1, in FIG. 1, the tread width TW and the width Ws of the circumferential reinforcing layer 145 preferably have a relationship such that 0.70≤Ws/TW≤0.90.

The tread width TW is the distance in the direction of the tire rotational axis between the left and right tread ends P, P, measured when the tire is mounted on a specified rim, inflated to a specified internal pressure, is in an unloaded state.

The width Ws of the circumferential reinforcing layer 145 is the distance from the left to the right end portions of the circumferential reinforcing layer 145 in the tire rotational axis direction measured when the tire is mounted on a specified rim, inflated to a specified internal pressure, and is in an unloaded state. Also, the width Ws of the circumferential reinforcing layer 145 is the distance between the outermost end portions of the divided portions when the circumferential reinforcing layer 145 has a structure that is divided in the tire width direction (not illustrated).

Moreover, a typical pneumatic tire has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated), the range of the ratio Ws/TW between the width Ws of the circumferential reinforcing layer 145 and the tread width TW is stipulated by conversion to half width based on the tire equatorial plane CL. Specifically, the distance TW' (not illustrated) from the tire equatorial plane CL to the tread edge P and the distance Ws' (not illustrated) from the tire equatorial plane CL to the end portion of the circumferential reinforcing layer 145 are set satisfying the relationship $0.70 \leq Ws'/TW' \leq 0.90$.

Also, as illustrated in FIG. 1, preferably, a tread width TW and a total tire width SW have a relationship such that $0.79 \leq TW/SW \leq 0.89$.

The total tire width SW refers to a linear distance (including all portions such as letters and patterns on the tire surface) between the side walls when the tire is mounted on a specified rim, inflated to the specified internal pressure, and is in an unloaded state.

Also, as illustrated in FIG. 2, preferably, a distance Hcc from the circumferential reinforcing layer 145 to the tread profile on the tire equatorial plane CL and a distance He from the end portion of the circumferential reinforcing layer 145 to the tread profile have a relationship such that $He/Hcc \leq 0.97$. There is no particular limitation on the lower limit of the ratio He/Hcc, but it is restricted by its relationship to the tire groove depth. For example, the lower limit of the ratio He/Hcc is preferably in the range of $0.8 \leq He/Hcc$.

The distance Hcc and the distance He are measured with the tire mounted on a specified rim, inflated to the specified internal pressure, and is in an unloaded state. Additionally, the measurement point on the circumferential reinforcing layer 145 side is defined by a curve connecting the center points of the belt cords that constitute the circumferential reinforcing layer 145, when viewed as a cross-section from the tire meridian direction. Moreover, the end portion of the circumferential reinforcing layer 145 is defined using the belt cord on the outermost side in the tire width direction among the belt cords that constitute the circumferential reinforcing layer 145.

Also, preferably, a width Wb2 of the wider cross belt 142 and a cross-sectional width Wca of the carcass layer 13 have a relationship such that $0.74 \leq Wb2/Wca \leq 0.89$, and more preferably within the range of $0.78 \leq Wb2/Wca \leq 0.83$.

Preferably, the width Ws of the circumferential reinforcing layer 145 and the cross-sectional width Wca of the carcass layer 13 have a relationship such that $0.60 \leq Ws/Wca \leq 0.70$.

Additionally, the tread width TW and the cross-sectional width Wca of the carcass layer 13 preferably have a relationship such that $0.82 \leq TW/Wca \leq 0.92$.

The cross-sectional width Wca of the carcass layer 13 refers to a linear distance between the left and right maximum width positions of the carcass layer 13 when the tire is mounted on a specified rim, inflated to the specified internal pressure, and is in an unloaded state.

Also, in FIG. 3, preferably, a width Wb3 of the narrower cross belt 143 and the width Ws of the circumferential reinforcing layer 145 have a relationship such that $0.75 \leq Ws/Wb3 \leq 0.90$. As a result, the width Ws of the circumferential direction reinforcing layer 145 can be properly secured.

Also, as illustrated in FIG. 3, the circumferential reinforcing layer 145 is preferably disposed inward in the tire width direction from the left and right edge portions of the narrower cross belt 143 of the pair of cross belts 142, 143. Additionally, the width Wb3 of the narrower cross belt 143 and the distance S from the edge portion of the circumferential direction reinforcing layer 145 to the edge portion of the narrower cross belt 143 is preferably in a range of $0.03 \leq S/Wb3 \leq 0.12$. As a result, the distance between the end portions of the width Wb3 of the cross belt 143 and the end portions of the circumferential reinforcing layer 145 are properly secured. This point is the same even if the circumferential reinforcing layer 145 has a divided structure (not illustrated).

The distance S of the circumferential reinforcing layer 145 is measured as a distance in the tire width direction when the tire is mounted on a specified rim, inflated to a specified internal pressure, and is in an unloaded state.

Furthermore, in the configuration in FIG. 1, the circumferential reinforcing layer 145 is constituted by a single steel wire wound in a spiral manner, as illustrated in FIG. 3. However, the configuration is not limited thereto, and the circumferential reinforcing layer 145 may also be configured by a plurality of wires wound spirally around side-by-side to each other (multiple winding structure). In this case, preferably, the number of wires is 5 or less. Additionally, the width of winding per unit when five wires are wound in multiple layers is preferably not more than 12 mm. As a result, a plurality of wires (not less than 2 and not more than 5 wires) can be wound properly at a slant within a range of ±5° with respect to the tire circumferential direction.

Furthermore, in the pneumatic tire 1, the width Wb1 of the large angle belt 141 and the width Wb3 of the narrower cross belt 143 of the pair of cross belts 142, 143 preferably have a relationship satisfying $0.85 \leq Wb1/Wb3 \leq 1.05$ (see FIG. 3). As a result, the ratio Wb1/Wb3 is made appropriate.

The width Wb1 of the large angle belt 141 and the width Wb3 of the cross belt 143 are measured as the distance in the tire width direction when the tire is mounted on a specified rim, inflated to the specified internal pressure, and is in an unloaded state.

In the configuration of FIG. 1, the belt layer 14 has a structure with left-right symmetry centered on the tire equatorial plane CL as illustrated in FIG. 3, and the width Wb1 of the large angle belt 141 and the width Wb3 of the narrower cross belt 143 have a relationship satisfying Wb1<Wb3. As a result, an edge portion of the large angle belt 141 is disposed on an inner side in the tire width direction than the edge portion of the narrower cross belt 143 in a region on either side of the tire equatorial plane CL. However, the configuration is not limited thereto, and the width Wb1 of the large angle belt 141 and the width Wb3 of the narrower cross belt 143 may have a relationship such that Wb1≥Wb3 (not illustrated).

Also, preferably, the belt cords of the large angle belt 141 are steel wires, and the number of ends of the large angle belt is not less than 15 ends/50 mm and not more than 25 ends/50 mm. Moreover, the belt cords of the pair of cross belts 142, 143 are constituted by steel wire, and the number of ends in the pair of cross belts 142, 143 preferably is not less than 18 ends/50 mm and not more than 28 ends/50 mm, and more preferably is not less than 20 ends/50 mm and not more than 25 ends/50 mm. Also, the belt cords that constitute the circumferential reinforcing layer 145 are steel wire, and the circumferential reinforcing layer 145 preferably has not less than 17 ends/50 mm and not more than 30 ends/50 mm. As a result, the strengths of the belt plies 141, 142, 143, 145 are properly secured.

Also, preferably, a modulus E1 at 100% elongation of the coating rubber of the large angle belt 141 and a modulus Es at 100% elongation of the coating rubber of the circumferential reinforcing layer 145 have a relationship such that $0.90 \leq Es/E1 \leq 1.10$. Moreover, moduli E2, E3 at 100% elongation of the coating rubbers of the pair of cross belts 142, 143, and the modulus Es at 100% elongation of the coating rubber of the circumferential reinforcing layer 145 preferably have a relationship satisfying $0.90 \leq Es/E2 \leq 1.10$ and $0.90 \leq Es/E3 \leq 1.10$. Moreover, the modulus Es at 100% elongation of the coating rubber of the circumferential reinforcing layer 145 is preferably within the range of $4.5 \text{ MPa} \leq Es \leq 7.5 \text{ MPa}$. As a result, the moduli of the belt plies 141, 142, 143, 145 are made appropriate.

The modulus at 100% elongation is measured in a tensile test at ambient temperature in conformance with JIS K6251 (using dumbbell no. 3).

Also, preferably, a breaking elongation λ1 of the coating rubber of the large angle belt 141 is in the range of $\lambda 1 \geq 200\%$. Moreover, breaking elongations λ2, λ3 of the coating rubbers of the pair of cross belts 142, 143 are preferably in the range of $\lambda 2 \geq 200\%$ and $\lambda 3 \geq 200\%$. Furthermore, a breaking elongation λs of the coating rubber of the circumferential reinforcing layer 145 is preferably in the range of $\lambda s \geq 200\%$. As a result, the durability of the belt plies 141 142, 143, 145 is properly secured.

Breaking elongation is measured by performing a tensile test conforming to JIS-K7161 on a test sample of the JIS-K7162 specification 1B shape (dumb bell shape with a thickness of 3 mm) using a tensile tester (INSTRON5585H manufactured by Instron Corp.) at a pulling speed of 2 mm/min.

Elongation of the belt cords as components that configure the circumferential reinforcing layer 145 is preferably not less than 1.0% and not more than 2.5% when the tensile load is from 100 N to 300 N, and is preferably not less than 0.5% and not more than 2.0% when the tensile load is from 500 N to 1000 N as a tire (when removed from the tire). The belt cords (high elongation steel wire) have good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Additionally, in the pneumatic tire 1, the breaking elongation of the tread rubber 15 is preferably not less than 350%. As a result, the strength of the tread rubber 15 is assured and the occurrence of tears in the outermost circumferential main groove 2 is suppressed. Furthermore, the maximum breaking elongation of the tread rubber 15 is not specifically limited, but is constrained by the type of rubber compound of the tread rubber 15.

Additionally, in this pneumatic tire 1, the hardness of the tread rubber 15 preferably is equal to or greater than 60. This ensures an appropriate strength of the tread rubber 15. Furthermore, the maximum hardness of the tread rubber 15 is not specifically limited, but is constrained by the type of rubber compound of the tread rubber 15.

Here, "rubber hardness" refers to JIS-A hardness in accordance with JIS-K6263.

Also, in the pneumatic tire 1, preferably, a loss tangent tan δ of the tread rubber 15 is in the range of $0.1 \leq \tan \delta$.

The loss tangent tan δ is measured by using a viscoelastic spectrometer under the conditions of a temperature of 20° C., a shearing strain of 10%, and a frequency of 20 Hz.

Belt Cushion

As illustrated in FIG. 2, the pneumatic tire 1 includes a belt cushion 20. The belt cushion 20 is disposed so as to be interposed between the carcass layer 13 and the end portion of the cross belt 142 on the inner side in the tire radial direction of the pair of cross belts 142, 143. For example, in the configuration in FIG. 2, an end portion of the belt cushion 20 on the outer side in the tire radial direction is inserted between the carcass layer 13 and the end portion of the cross belt 142, and abuts the edge portion of the large angle belt 141. Additionally, the belt cushion 20 extends inward in the tire radial direction along the carcass layer 13 and is disposed so as to be interposed between the carcass layer 13 and a sidewall rubber 16. Moreover, a pair of left and right belt cushions 20 are respectively disposed at the left and right side wall portions of the tire.

Additionally, a modulus Ebc at 100% elongation of the belt cushion 20 satisfies a range of $1.5 \text{ MPa} \leq Ebc \leq 3.0 \text{ MPa}$. Having the modulus Ebc satisfying such a range, the belt cushion 20 exhibits the stress relief action, thereby suppressing separation of the peripheral rubber at the end portions of the cross belt 142.

Moreover, a breaking elongation λbc of the belt cushion 20 satisfies a range of $\lambda bc \geq 400\%$. This ensures an appropriate durability of the belt cushion 20.

[Belt Edge Cushion Two-Color Structure]

Figure 7:
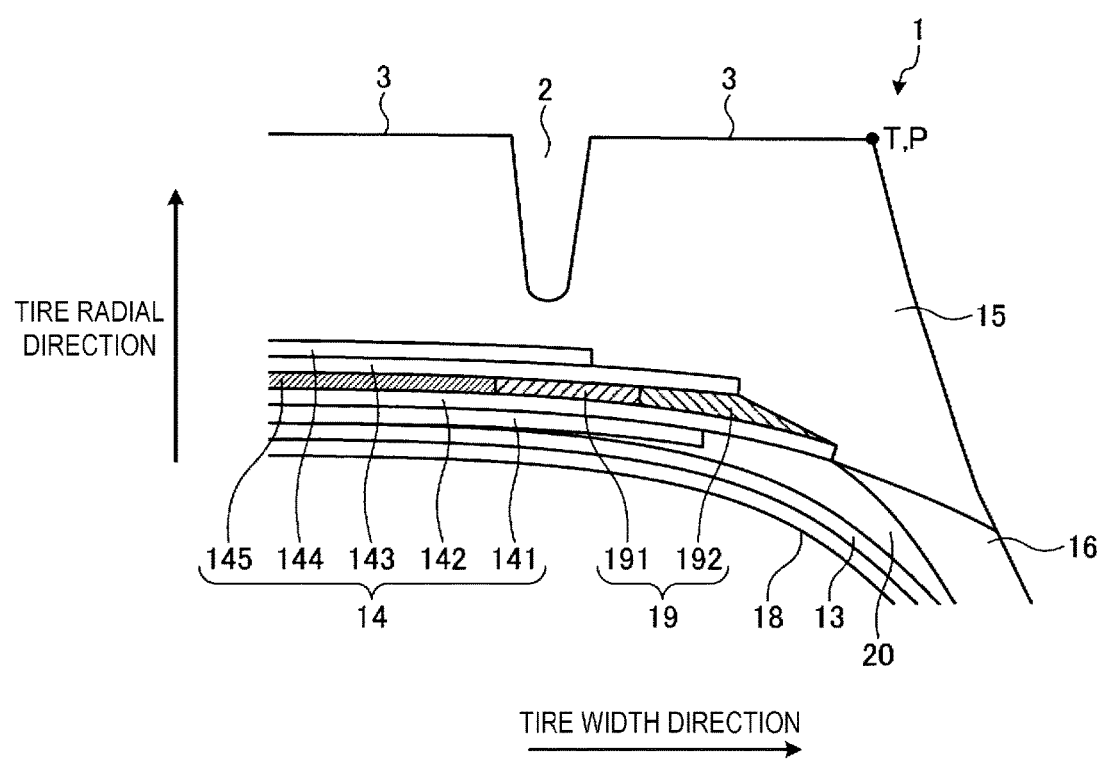
FIG. 7 is an explanatory view illustrating a modified example of the pneumatic tire depicted in FIG. 1.

FIG. 7 is an explanatory view of a modified example of the pneumatic tire depicted in FIG. 1. FIG. 7 is an enlarged view of an end portion of the belt layer 14 on the outer side in the tire width direction. The circumferential reinforcing layer 145 and the belt edge cushion 19 in FIG. 6 are indicated by hatching.

In the configuration illustrated in FIG. 1, the circumferential reinforcing layer 145 is disposed inward in the tire width direction of the left and right edges of the narrower cross belt 143 of the pair of cross belts 142, 143. The belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship such that $0.60 \leq E/Eco \leq 0.95$. As a result, there is an advantage that the occurrence of separation of rubber materials between the pair of cross belts 142, 143 and in a region on the outer side in the tire width direction of the circumferential reinforcing layer 145 is suppressed.

Conversely, according to the configuration illustrated in FIG. 7, the belt edge cushion 19 in the configuration illustrated in FIG. 1 has a two-color structure composed of a stress relief rubber 191 and an end portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145.

The end portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, when viewed as a cross-section from the tire meridian direction, the belt edge cushion 19 has a structure composed by disposing the stress relief rubber 191 and the end portion relief rubber 192 side to side in the tire width direction to fill a region from the end portion of the circumferential reinforcing layer 145 on the outer side in the tire width direction to the edge portion of the pair of cross belts 142, 143.

Additionally, in the configuration of FIG. 7, a modulus Ein at 100% elongation of the stress relief rubber 191 and the modulus Es at 100% elongation of the coating rubber of the circumferential reinforcing layer 145 have a relationship satisfying Ein<Es. Specifically, the modulus Ein of the stress relief rubber 191 and the modulus Es of the circumferential reinforcing layer 145 preferably have a relationship such that $0.6 \leq Ein/Es \leq 0.9$.

Moreover, in the configuration illustrated in FIG. 7, a modulus Ein at 100% elongation of the stress relief rubber 191 and the modulus Eco at 100% elongation of the coating rubber of the cross belts 142, 143 have a relationship such that Ein<Eco. Specifically, the modulus Ein of the stress relief rubber 191 and the modulus Eco of the coating rubber preferably have a relationship such that $0.6 \leq Ein/Eco \leq 0.9$.

Additionally, in the configuration of FIG. 7, a modulus Eout at 100% elongation of the end portion relief rubber 192 and the modulus Ein at 100% elongation of the stress relief rubber 191 preferably have a relationship satisfying Eout<Ein. Additionally, the modulus Ein at 100% elongation of the stress relief rubber 191 preferably is within a range such that $4.0 \text{ MPa} \leq Ein \leq 5.5 \text{ MPa}$.

Since the stress relief rubber 191 is disposed on the outer side of the circumferential reinforcing layer 145 in the tire width direction in the configuration illustrated in FIG. 7, shearing strain of the peripheral rubbers between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, separation of the peripheral rubber of the circumferential reinforcing layer 145 is suppressed.
Effect As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). Also, the pneumatic tire 1 includes at least three circumferential main grooves 2 extending in the tire circumferential direction, and the plurality of land portions 3 partitioned and formed by the circumferential main grooves 2. Also, the belt layer 14 is formed by laminating the pair of cross belts 142, 143 having a belt angle, as an absolute value, of not less than 10° and not more than 45° and having mutually opposite signs, and the circumferential reinforcing layer 145 having a belt angle within a range of ±5° with respect to the tire circumferential direction (see FIG. 2). Also, when viewed as a cross-section from the tire meridian direction, when the wear end surface WE of the circumferential main grooves 2 is drawn, the distance Dcc on the tire equatorial plane CL from the circumferential reinforcing layer 145 to the wear end surface WE and the distance De from the end portion of the circumferential reinforcing layer 145 to the wear end surface WE have a relationship such that $De/Dcc \leq 0.94$.

In this configuration, the distances Dcc, De of the circumferential reinforcing layer 145 with respect to the wear end surface WE are made appropriate, so the strain of the circumferential reinforcing layer 145 when the tire contacts the ground is reduced (see the comparison of FIGS. 4A and 4B). Accordingly, there is an advantage that separation of the peripheral rubber of the circumferential reinforcing layer 145 is reduced.

Also, in the pneumatic tire 1, the distance Gcc from the tread profile to the tire inner circumferential surface along the tire equatorial plane CL, and the distance Gsh from the tread edge P to the tire inner circumferential surface have a relationship such that $1.10 \leq Gsh/Gcc$ (see FIG. 2). In this configuration, the tread profile when the tire does not contact the ground has an overall flat shape (see FIGS. 1 and 2), so the amount of deformation of the tread portion shoulder region when the tire makes ground contact is reduced (see the comparison of FIGS. 4A and 4B). Accordingly, there is an advantage that separation of the peripheral rubber of the circumferential reinforcing layer 145 is effectively reduced. Also, there is an advantage that repeated strain at the end portion of the circumferential reinforcing layer 145 while the tire is rolling is reduced and rupturing of the belt cords of the circumferential reinforcing layer is reduced.

Additionally, in this pneumatic tire 1, the tread width TW and the width Ws of the circumferential reinforcing layer 145 have the relationship satisfying $0.70 \leq Ws/TW \leq 0.90$ (see FIG. 1). In such a configuration, due to the ratio Ws/TW between the tread width TW and the width Ws of the circumferential reinforcing layer 145 being made appropriate, there is an advantage that the amount of deformation of the shoulder land portion 3 when the tire contacts the ground is effectively reduced (see FIG. 4B and FIG. 5). That is, the width Ws of the circumferential reinforcing layer 145 is properly ensured and the amount of deformation of the shoulder land portion 3 when the tire contacts the ground is reduced due to the ratio Ws/TW being equal to or greater than 0.70. Also, by satisfying the relationship $Ws/TW \leq 0.90$, due to the fact that the deformation of the end portions of each of the belt plies when the tire contacts the ground is reduced, the strain of the end portions of each of the belt plies is reduced.

Also, in the pneumatic tire 1, the tread width TW and the total tire width SW have a relationship such that $0.70 \leq TW/SW \leq 0.89$ (see FIG. 1). In this configuration, radial growth of the left and right shoulder portions is reduced by having the ratio TW/SW within the above range. Consequently, a difference in radial growths between the center region and the shoulder region is alleviated and the tire contact pressure distribution is made uniform. This has the advantage that the uneven wear resistance of the tire is increased. Specifically, an average ground contact pressure is reduced due to the ratio TW/SW being equal to or greater than 0.79. Moreover, rising of the shoulder portion is suppressed and deformation when the tire makes ground contact is suppressed due to the ratio TW/SW being less than or equal to 0.89.

Also, in the pneumatic tire 1, the distance Hcc from the circumferential reinforcing layer 145 to the tread profile on the tire equatorial plane CL, and the distance He from the end portion of the circumferential reinforcing layer 145 to the tread profile has a relationship such that $He/Hcc \leq 0.97$ (see FIG. 2). In this configuration, the positional relationship between the circumferential reinforcing layer 145 and the tread profile (the ratio He/Hcc) is made appropriate, so the strain of the circumferential reinforcing layer 145 is reduced when the tire contacts the ground. Accordingly, there is an advantage that separation of the peripheral rubber of the circumferential reinforcing layer 145 is reduced.

Also, in the pneumatic tire 1, the width Wb2 of the wider cross belt 142 and the cross-sectional width Wca of the carcass layer 13 have a relationship such that 0.74≤Wb2/Wca≤0.89 (see FIG. 1). In this way, the width Wb2 of the wider cross belt is made appropriate, which has the advantage that the stiffness of the tread portion is ensured.

Additionally, in the pneumatic tire 1, the tread width TW and a cross-sectional width Wca of the carcass layer 13 have a relationship such that 0.82≤TW/Wca≤0.92 (see FIG. 1).

In such a configuration, radial growth in the center region is suppressed due to the belt layer 14 having the circumferential reinforcing layer 145. Furthermore, a difference in radial growths between the center region and a shoulder region is alleviated and the ground contact pressure distribution in a tire width direction is made uniform due to the ratio TW/Wca being within the above range. This has the advantage of making the ground contact pressure of the tire uniform. Specifically, the air volume inside the tire is secured and deformation suppressed due to TW/Wca being equal to or greater than 0.82. Moreover, the relationship satisfying TW/Wca≤0.92 has the advantage of suppressing rising of the shoulder portion to make the ground contact pressure distribution uniform.

Also, in the pneumatic tire 1, the belt cords of the cross belts 142, 143 are steel wires, with the number of ends of not less than 18 ends/50 mm and not more than 28 ends/50 mm. As a result, there is an advantage that the number of ends of the cords of the cross belts 142, 143 is made appropriate. In other words, the strength of the cross belts 142, 143 is properly ensured by having not less than 18 ends/50 mm. Also, by having not more than 28 ends/50 mm, the amount of rubber of the coating rubber of the cross belts 142, 143 is properly ensured, and separation of rubber material between adjacent belt plies is reduced.

Moreover, in the pneumatic tire 1, the modulus Es at 100% elongation of the coating rubber of the circumferential reinforcing layer 145 is in ranges such that 4.5 MPa≤Es≤7.5 MPa. As a result, there is an advantage that the modulus of the coating rubber of the circumferential reinforcing layer 145 is made appropriate.

Furthermore, in the pneumatic tire 1, the breaking elongation λs of the coating rubber of the circumferential reinforcing layer 145 is within a range of λs≥200%. As a result, there is an advantage that the durability of the circumferential reinforcing layer 145 is properly ensured.

Also, in the pneumatic tire 1, the breaking elongations λ2, λ3 of the coating rubber of the pair of cross belts 142, 143 are in the range of λ2≥200%, and λ3≥200%. As a result, there is an advantage that the durability of the pair of cross belts 142, 143 is properly ensured.

Additionally, the pneumatic tire 1 includes the belt cushion 20 disposed so as to be interposed between the carcass layer 13 and the end portion of the cross belt 142 on the inner side in the tire radial direction of the pair of cross belts 142, 143 (see FIG. 1 and FIG. 2). Additionally, a modulus Ebc at 100% elongation of the belt cushion 20 satisfies a range of 1.5 MPa≤Ebc≤3.0 MPa. In such a configuration, the belt cushion 20 is disposed between the carcass layer 13 and the cross belt 142 on the inner side in the tire radial direction, and the modulus Ebc of the belt cushion 20 is made appropriate. This has the advantage of making the belt cushion 20 exhibit the stress relief action to suppress separation of the peripheral rubber at the end portions of the cross belt 142 is suppressed. Specifically, the relationship satisfying 1.5 MPa≤Ebc ensures appropriate durability for the belt cushion 20, and the relationship satisfying Ebc≤3.0 MPa ensures appropriate stress relief action for the belt cushion 20.

Additionally, in the pneumatic tire 1, the breaking elongation λbc of the belt cushion 20 satisfies a range of λbc≥400%. This has the advantage of ensuring appropriate durability for the belt cushion 20.

Also, when viewed as a cross-section from the tire meridian direction, the land portions 3 on the inner side in the tire width direction of the left and right outermost circumferential main grooves 2, 2 have the first profile PL1 that is convex to the outer side in the tire radial direction (see FIG. 6). Also, the shoulder portions 3 on the outer side in the tire width direction of the left and right outermost circumferential main grooves have the second profile PL2 that is convex to the inner side in the tire radial direction within the ground contact patch. Also, the distance d in the tire radial direction between the extended line of the first profile PL1 and the second profile PL2 within the ground contact patch of the shoulder land portion 3 increases toward the outer side in the tire width direction. In this configuration, the ground contact pressure on the ground contact edge T side of the shoulder land portion 3 when the tire contacts the ground is increased, so the amount of sliding of the land portions 3 of the center region and the amount of sliding of the shoulder land portions 3 when the tire contacts the ground is made uniform. As a result, there is an advantage that uneven wear of the shoulder land portions 3 is reduced, and the uneven wear resistance performance is improved.

Also, in the pneumatic tire 1, the belt cords of the circumferential reinforcing layer 145 are steel wire, and the circumferential reinforcing layer 145 has the number of ends of not less than 17 ends/50 mm and not more than 30 ends/50 mm. As a result, there is an advantage that the number of ends of the belt cords of the circumferential reinforcing layer 145 is made appropriate. Specifically, the strength of the circumferential reinforcing layer 145 is properly ensured by having the number of ends of not less than 17 ends/50 mm. Also, by having the number of ends of not more than 30 ends/50 mm, the amount of rubber of the coating rubber of the circumferential reinforcing layer 145 is properly ensured, and separation of the rubber material between adjacent belt plies (in FIG. 3, between the pair of cross belts 142, 143 and the circumferential reinforcing layer 145) is reduced.

In the pneumatic tire 1, the elongation of the belt cords from which the circumferential reinforcing layer 145 is configured when they are components when subjected to a tensile load of 100 N to 300 N is preferably not less than 1.0% and not more than 2.5%. As a result, there is an advantage that the effect of suppressing radial growth in the center region is properly secured due to the circumferential reinforcing layer 145.

In the pneumatic tire 1, elongation is not less than 0.5% and not more than 2.0% when the tensile load of the belt cords as tire components that constitute the circumferential reinforcing layer 145 is from 500 N to 1000 N. As a result, there is an advantage that the effect of suppressing radial growth in the center region is properly secured due to the circumferential reinforcing layer 145.

In the pneumatic tire 1, the circumferential reinforcing layer 145 is disposed inward in the tire width direction of the left and right edges of the narrower cross belt 143 of the pair of cross belts 142, 143 (see FIG. 3). The pneumatic tire 1 includes the stress relief rubber 191 disposed between the pair of cross belts 142, 143 and on the outer side of the circumferential reinforcing layer 145 in the tire width direction so as to be adjacent to the circumferential reinforcing layer 145, and the end portion relief rubber 192 disposed between the pair of cross belts 142, 143 and on the outer side of the stress relief rubber 191 in the tire width direction and at a position corresponding to the edge portion of the pair of cross belts 142, 143 so as to be adjacent to the stress relief rubber 191 (see FIG. 7). In such a configuration, there is an advantage that fatigue rupture of the peripheral rubber at the edge portion of the circumferential reinforcing layer 145 is suppressed due to the circumferential reinforcing layer 145 being disposed on the inner side in the tire width direction from the left and right edge portions of the narrower cross belt 143 of the pair of cross belts 142, 143. Since the stress relief rubber 191 is disposed on the outer side of the circumferential reinforcing layer 145 in the tire width direction, shearing strain of the peripheral rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, there is an advantage that separation of the peripheral rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying Ein<Eco. As a result, there is an advantage that the modulus Ein of the stress relief rubber 191 is made appropriate and the shearing strain of the peripheral rubber between the edge portion of the circumferential reinforcing layer 145 and the cross belts 142, 143 is alleviated.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying $0.6 \leq Ein/Eco \leq 0.9$. As a result, there is an advantage that the ratio Ein/Eco is made appropriate and the shearing strain of the peripheral rubber between the edge portion of the circumferential reinforcing layer 145 and the cross belts 142, 143 is alleviated.

Additionally, in the pneumatic tire 1, the modulus Ein at 100% elongation of the stress relief rubber 191 is within a range of $4.0 \text{ MPa} \leq Ein \leq 5.5 \text{ MPa}$ (see FIG. 7). As a result, there is an advantage that the modulus Ein of the stress relief rubber 191 is made appropriate and the shearing strain of the peripheral rubber between the edge portion of the circumferential reinforcing layer 145 and the cross belts 142, 143 is alleviated.

In the pneumatic tire 1, the circumferential reinforcing layer 145 is disposed inward in the tire width direction of the left and right edges of the narrower cross belt 143 of the pair of cross belts 142, 143 (see FIG. 3). Also, the width Wb3 of the narrower cross belt 143 and the distance S from the edge portion of the circumferential reinforcing layer 145 to the edge portion of the narrower cross belt 143 are in a range of $0.03 \leq S/Wb3 \leq 0.12$. This has the advantage of providing an appropriate positional relationship S/Wb3 between the edge portions of the cross belts 142, 143 and the edge portions of the circumferential reinforcing layer 145. Specifically, the relationship satisfying $0.03 \leq S/Wb3$ ensures an appropriate distance between the end portions of the circumferential reinforcing layer 145 and the end portions of the cross belt 143 to suppress the separation of the peripheral rubbers at the end portions of these belt plies 145, 143. Additionally, the relationship satisfying $S/Wb3 \leq 0.12$ ensures the width Ws of the circumferential reinforcing layer 145 relative to the width Wb3 of the cross belt 143 to ensure an appropriate hoop effect from the circumferential reinforcing layer 145.

Target of Application

The pneumatic tire 1 is preferably applied to a heavy duty tire with an aspect ratio of not less than 40% and not more than 70% when mounted on a regular rim, inflated with a regular internal pressure and a regular load is applied. A heavy duty tire has a higher load under use than a passenger car tire. As a result, the difference in the diameters between the disposition region of the circumferential reinforcing layer 145 in the tread surface and the region on the outer side in the tire width direction from the circumferential reinforcing layer 145 may easily increase. Moreover, a ground contact shape having an hourglass shape occurs easily in the tire having the above-mentioned low aspect ratio. Accordingly, a significant effect in improving the belt-edge-separation resistance performance of the tire as described above is achieved by applying the pneumatic tire 1 to such as a heavy duty tire.

EXAMPLES

FIGS. 8A to 10B are tables showing results of performance testing of pneumatic tires according to embodiments of the present technology.

In the performance testing, a plurality of mutually differing pneumatic tires was evaluated for belt-edge-separation resistance performance (see FIGS. 8A to 10B). In this evaluation, pneumatic tires having a tire size of 315/60 R22.5 were mounted on a rim having a rim size of 22.5×9.00 and inflated with 900 kPa of air pressure. Low pressure endurance testing was conducted using an indoor drum testing machine. Then, a running speed was set to 45 km/h, the load was increased from a load of 34.81 kN by 5% (1.74 kN) every 12 hours, and a running distance when the tire failed was measured. Then, based on the measurement results, index evaluation was performed taking a Conventional Example as a reference (100). A larger numerical value is preferable in the evaluations. Specifically, an evaluation of 105 or greater (+5 points or more over the standard value of 100) indicates sufficient superiority over the conventional example, and an evaluation of 110 or greater indicates dramatic superiority over the conventional example.

The pneumatic tires 1 of Working Example 1 had the configuration illustrated in FIGS. 1 to 3. Also, the belt angle of the cross belts 142, 143 was ±19°, and the belt angle of the circumferential reinforcing layer 145 was substantially 0°. Also, the main dimensions were set to TW=275 mm, Gcc=32.8 mm, Dcc=11.2 mm, Hcc=21.3 mm, and Wca=320 mm. The pneumatic tires 1 of Working Examples 2 to 39 are modified examples of the pneumatic tire of Working Example 1.

In the configuration of FIGS. 1 to 3, the pneumatic tire of the Conventional Example does not have a circumferential reinforcing layer 145.

As can be seen from the test results, the pneumatic tires 1 of the Working Examples 1 to 39 demonstrate improved belt-edge-separation resistance performance of the tire. Also, comparing Working Examples 1 to 5, by making $1.20 \leq Gsh/Gcc$ and $De/Dcc \leq 0.92$, it can be seen that an excellent effect of belt-edge-separation resistance performance can be obtained (evaluation 105 or higher).

What is claimed is:
1. A pneumatic tire comprising:
a carcass layer;
a belt layer disposed on an outer side in a tire radial direction of the carcass layer;
a tread rubber disposed on an outer side in the tire radial direction of the belt layer;
at least three circumferential main grooves extending in a tire circumferential direction; and
a plurality of land portions partitioned and formed by the circumferential main grooves,
the belt layer being formed by laminating a pair of cross belts having a belt angle, as an absolute value, of not less than 10° and not more than 45° and mutually opposite signs, and a circumferential reinforcing layer having a belt angle within a range of ±5° with respect to the tire circumferential direction, and
upon a wear end surface WE of the circumferential main groove being drawn when viewed as a cross-section from a tire meridian direction,
a distance Dcc on a tire equatorial plane from the circumferential reinforcing layer to the wear end surface WE and a distance De from an end portion of the circumferential reinforcing layer to the wear end surface WE having a relationship such that De/Dcc≤0.94,
a distance Gcc from a tread profile to a tire inner circumferential surface at the tire equatorial plane and a distance Gsh from a tread edge to the tire inner circumferential surface having a relationship such that 1.20≤Gsh/Gcc, and
a tread profile overall having a flat shape parallel to a tire rotational axis when the tire is not in contact with a ground.

2. The pneumatic tire according to claim 1, wherein a tread width TW and a width Ws of the circumferential reinforcing layer have a relationship such that 0.70≤Ws/TW≤0.90.

3. The pneumatic tire according to claim 1, wherein a tread width TW and a total tire width SW have a relationship such that 0.79≤TW/SW≤0.89.

4. The pneumatic tire according to claim 1, wherein a distance Hcc from the circumferential reinforcing layer to a tread profile on the tire equatorial plane and a distance He from the end portion of the circumferential reinforcing layer to the tread profile have a relationship such that He/Hcc≤0.97.

5. The pneumatic tire according to claim 1, wherein a width Wb2 of a wider cross belt and a cross-sectional width Wca of the carcass layer have a relationship such that 0.74≤Wb2/Wca≤0.89.

6. The pneumatic tire according to claim 1, wherein a tread width TW and a cross-sectional width Wca of the carcass layer have a relationship such that 0.82≤TW/Wca≤0.92.

7. The pneumatic tire according to claim 1, wherein belt cords of the cross belt are steel wires, and a number of ends is not less than 18 ends/50 mm and not more than 28 ends/50 mm.

8. The pneumatic tire according to claim 1, wherein a modulus Es at 100% elongation of a coating rubber of the circumferential reinforcing layer is in ranges such that 4.5 MPa≤Es≤7.5 MPa.

9. The pneumatic tire according to claim 1, wherein moduli E2, E3 at 100% elongation of coating rubbers of the pair of cross belts and a modulus Es at 100% elongation of the coating rubber of the circumferential reinforcing layer are in ranges such that 0.90≤Es/E2≤1.10 and 0.90≤Es/E3≤1.10.

10. The pneumatic tire according to claim 1, wherein a breaking elongation λs of a coating rubber of the circumferential reinforcing layer is within a range of λs≥200%.

11. The pneumatic tire according to claim 1, wherein breaking elongations λ2, λ3 of coating rubbers of the pair of cross belts are both equal to or greater than 200%.

12. The pneumatic tire according to claim 1, further comprising a belt cushion disposed so as to be interposed between the carcass layer and an end portion of a cross belt of the pair of cross belts, the cross belt being disposed on an inner side in the tire radial direction, wherein
a modulus Ebc at 100% elongation of the belt cushion is in a range such that 1.5 MPa≤Ebc≤3.0 MPa.

13. The pneumatic tire according to claim 12, wherein a breaking elongation λbc of the belt cushion is in a range of λbc≥400%.

14. The pneumatic tire according to claim 1, wherein belt cords of the circumferential reinforcing layer are steel wire and have a number of ends of not less than 17 ends/50 mm and not more than 30 ends/50 mm.

15. The pneumatic tire according to claim 1, wherein elongation of belt cords as components that constitute the circumferential reinforcing layer is not less than 1.0% and not more than 2.5% when a tensile load is from 100 N to 300 N.

16. The pneumatic tire according to claim 1, wherein elongation of belt cords as tire components that constitute the circumferential reinforcing layer is not less than 0.5% and not more than 2.0% when a tensile load is from 500 N to 1000 N.

17. The pneumatic tire according to claim 1, wherein the circumferential reinforcing layer is disposed on an inner side in the tire width direction from left and right edge portions of a narrower cross belt of the pair of cross belts, and further comprising:
a stress relief rubber is disposed between the pair of cross belts and disposed on the outer side of the circumferential reinforcing layer in the tire width direction so as to be adjacent to the circumferential reinforcing layer; and
an end portion relief rubber disposed between the pair of cross belts and disposed on an outer side of the stress relief rubber in the tire width direction and in a position corresponding to an edge portion of the pair of cross belts, the end portion relief rubber being adjacent to the stress relief rubber.

18. The pneumatic tire according to claim 17, wherein a modulus Ein at 100% elongation of the stress relief rubber and a modulus Eco at 100% elongation of coating rubber of the pair of cross belts have a relationship such that Ein<Eco.

19. The pneumatic tire according to claim 17, wherein a modulus Ein at 100% elongation of the stress relief rubber and a modulus Eco at 100% elongation of coating rubber of the pair of cross belts have a relationship such that 0.6≤Ein/Eco≤0.9.

20. The pneumatic tire according to claim 17, wherein a modulus Ein at 100% elongation of the stress relief rubber is within a range of 4.0 MPa≤Ein≤5.5 MPa.

21. The pneumatic tire according to claim 1, wherein the circumferential reinforcing layer is disposed on an inner side in the tire width direction from left and right edge portions of a narrower cross belt of the pair of cross belts, and
a width Wb3 of the narrower cross belt and a distance S from an edge portion of the circumferential reinforcing layer to an edge portion of the narrower cross belt are within a range of 0.03≤S/Wb3.

22. The pneumatic tire according to claim 1 applied to a heavy duty tire with an aspect ratio of 70% or less.

23. The pneumatic tire according to claim 1, wherein the circumferential reinforcing layer terminates inward in the tire width direction of an outermost circumferential main groove in the tire width direction.

* * * * *